(12) United States Patent
Asakura et al.

(10) Patent No.: US 8,505,927 B2
(45) Date of Patent: Aug. 13, 2013

(54) FLANGE FASTENING SECTION AND COOLING SYSTEM OF FLANGE FASTENING SECTION

(75) Inventors: Daisuke Asakura, Kawasaki (JP); Takeo Suga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 12/973,244

(22) Filed: Dec. 20, 2010

(65) Prior Publication Data

US 2011/0148094 A1 Jun. 23, 2011

(30) Foreign Application Priority Data

Dec. 22, 2009 (JP) .................................. 2009-290502

(51) Int. Cl.
*F02F 11/00* (2006.01)
(52) U.S. Cl.
USPC ............................................ 277/597; 285/41
(58) Field of Classification Search
USPC .................... 285/41, 368; 277/597, 359, 930
See application file for complete search history.

(56) References Cited

U.S. PATENT DOCUMENTS

| | | | | |
|---|---|---|---|---|
| 2,691,460 A | * | 10/1954 | Barnebey | 220/232 |
| 2,891,807 A | * | 6/1959 | Auwarter | 285/41 |
| 3,248,119 A | * | 4/1966 | Smith et al. | 277/637 |
| 4,838,477 A | * | 6/1989 | Roach et al. | 228/222 |
| 5,332,239 A | | 7/1994 | Steinetz et al. | |

FOREIGN PATENT DOCUMENTS

| | | |
|---|---|---|
| DE | 195 46 161 A1 | 6/1997 |
| JP | 07050495 A * | 2/1995 |
| JP | 2007-127178 | 5/2007 |

OTHER PUBLICATIONS

Extended European Search Report issued Mar. 30, 2011, in Patent Application No. 10196149.8.
Office Action issued Jan. 15, 2013 in Chinese Patent Application No. 201010601718.8 (with English translation).

* cited by examiner

*Primary Examiner* — James Hewitt
*Assistant Examiner* — Jay R Ripley
(74) *Attorney, Agent, or Firm* — Oblon, Spivak, McClelland, Maier & Neustadt, L.L.P.

(57) ABSTRACT

In a flange fastening section that includes a flange of a pipe for forming a connection of the pipe to another pipe by connection of the flange to a flange of the another pipe, the flange has a groove in the face to be connected to the flange of the another pipe for forming the connection. A gasket including expanded graphite is at least partly accommodated in the groove, and at least one O-ring is at least partly accommodated in the groove and at the peripheral surface of the gasket. The O-ring has a cavity through which working fluid may flow, an inlet piping into which the working fluid may flow and an outlet piping out of which the working fluid may flow.

11 Claims, 12 Drawing Sheets

INNER SIDE OF O-RING          OUTER SIDE OF O-RING

INNER SIDE OF O-RING    OUTER SIDE OF O-RING

INNER SIDE OF O-RING                   OUTER SIDE OF O-RING

INNER SIDE OF O-RING　　　　　　　　　　　OUTER SIDE OF O-RING

FLANGE FASTENING SECTION AND COOLING SYSTEM OF FLANGE FASTENING SECTION

CROSS REFERENCE TO RELATED APPLICATION

This application is based upon and claims benefit of priority under 35 USC §119 to Japanese Patent Application No. 2009-290502, filed on Dec. 22, 2009, the entire contents of which are incorporated by reference herein.

BACKGROUND OF THE INVENTION

1. Field of the Invention

The present invention relates to a flange fastening section for connecting pipings and a cooling system of the flange fastening section used especially in a thermal power station such as a chemical plant and an electric plant.

2. Related Art

The flange fastening section is provided for connecting two pipings in the chemical plant, a nuclear power station, the thermal power station, a gas turbine and the like. A spiral gasket is accommodated along a circumferential groove in the flange in order to prevent leak of fluid from the flange fastening section and to improve sealing performance.

A problem of the conventional spiral gasket is described with reference to the drawings.

A spiral gasket 102 is accommodated in a flange groove 120 as illustrated in FIG. 12B in many cases in a flange fastening section 112 for connecting steam pipings 113 in a main steam system and a reheat steam system of the thermal power station up to a steam temperature of about 600° C. as illustrated in FIG. 12A. Heat from the steam fluid is transmitted in a direction indicated by an arrow 118.

The spiral gasket 102 has a structure obtained by rolling a filler material and a hoop material together, and expanded graphite and a superalloy material made of nonferrous metal are generally used as materials of the filler material and the hoop material, respectively.

Metallic O-ring 101, C-ring and the like are used as illustrated in FIG. 12C in the gas turbine and the like in addition to the spiral gasket 102. In this case also, the heat from the steam fluid is transmitted in the direction indicated by the arrow 118.

In this case, the sealing performance of the spiral gasket 102 depends on the expanded graphite mainly used as the filler material, and the sealing performance is hardly maintained with other materials.

However, recently, in order to prevent global warming, it is globally attempted to reduce emission of carbon dioxide ($CO_2$), which largely affects the warming. In a thermal power plant and the like also, a high-temperature steam turbine system has been developed in order to reduce the carbon dioxide emission, and the high-temperature system up to a steam temperature of about 750° C. has been discussed.

However, since steam oxidation of the expanded graphite used as the filler material is started at approximately 650° C. or higher, there is a problem that the graphite is burned down at about 750° C., so that this cannot be conventionally used.

There is also a problem that materials of the hoop material of the spiral gasket 102 and the O-ring capable of being used up to such a high-temperature range are limited to an extremely narrow range in terms of strength. Further, even when the materials may be used, it is significantly difficult to obtain the hoop material of the spiral gasket 102 and the O-ring by cutting work from such materials. Further, there is also a problem that plastic deformation such as creep deformation occurs when using a metal material in the high-temperature range and a sealing surface pressure gradually decreases.

The document, which discloses the technology regarding the conventional flange fastening section, is as follows.

Patent Document 1: Japanese Laid-Open Patent Application Publication No. 2007-127178

As described above, conventionally, the expanded graphite cannot be used as the filler material of the gasket embedded in the flange fastening section when realizing the high temperature in the chemical plant and the thermal and nuclear power stations, the materials for the hoop material and the O-ring are limited and the plastic deformation occurs, thereby a problem that the sealing surface pressure decreases arises.

SUMMARY OF THE INVENTION

An object of the present invention is to provide the flange fastening section and the cooling system of the flange fastening section, which may solve such a problem.

According to the present invention, there is provided a flange fastening section, comprising, a gasket including expanded graphite capable of being accommodated in a groove of a flange for connecting a plurality of pipings; and at least one O-ring arranged on an outer periphery of the gasket, wherein the O-ring has a cavity through which working fluid may flow, an inlet piping into which the working fluid may flow and an outlet piping out of which the working fluid may flow.

In this case, the O-ring may be arranged on an inner periphery of the gasket or on the inner periphery and the outer periphery thereof. Also, the O-ring and the gasket may be arranged in a joined state or so as to be adjacent to each other without being joined to each other.

According to the present invention, there is provided a cooling system of a flange fastening section, comprising, the above-mentioned flange fastening section, a first piping connected to the inlet piping for supplying the working fluid to the O-ring; and a second piping connected to the outlet piping for discharging the working fluid flowing out of the O-ring, wherein a pressure in the first piping is higher than a pressure in the second piping, and the working fluid is water whose temperature is lower than a temperature of fluid flowing through the piping.

According to the present invention, there is provided a cooling system of a flange fastening section, comprising, the above-mentioned flange fastening section; a first piping connected to the inlet piping for supplying the working fluid to the O-ring; a second piping connected to the outlet piping for discharging the working fluid flowing out of the O-ring; a first feed-water system piping connected to the first piping through an input adjusting valve; and a second feed-water system piping connected to the second piping through an output adjusting valve, wherein a pressure in the first piping is higher than a pressure in the second piping, and the working fluid is water of which temperature is lower than a temperature of fluid flowing through the piping.

According to the present invention, there is provided a cooling system of a flange fastening section, comprising, the above-mentioned flange fastening section; a first piping connected to the inlet piping for supplying the working fluid to the O-ring; a second piping connected to the outlet piping for discharging the working fluid flowing out of the O-ring; a third piping connected to the first piping through an input adjusting valve; a fourth piping connected to the second piping through an output adjusting valve; and a turbine connected to the third piping, wherein a pressure in the first piping is higher than a pressure in the second piping, and the working fluid is water of which temperature is lower than a temperature of fluid flowing through the piping.

According to the flange fastening section and the cooling system of the flange fastening section of the present invention, by cooling the gasket and the O-ring exposed to a severe temperature condition to turn down the temperature, the existing material may be used as the gasket and the O-ring, thereby realizing the high temperature.

DETAILED DESCRIPTION OF THE EMBODIMENTS

Hereafter, embodiments according to the present invention will be described with reference to the drawings.
(Configuration of First Embodiment)

A configuration of a flange fastening section according to a first embodiment of the present invention is described with reference to FIGS. 1A and 1B.

Figure 1A:
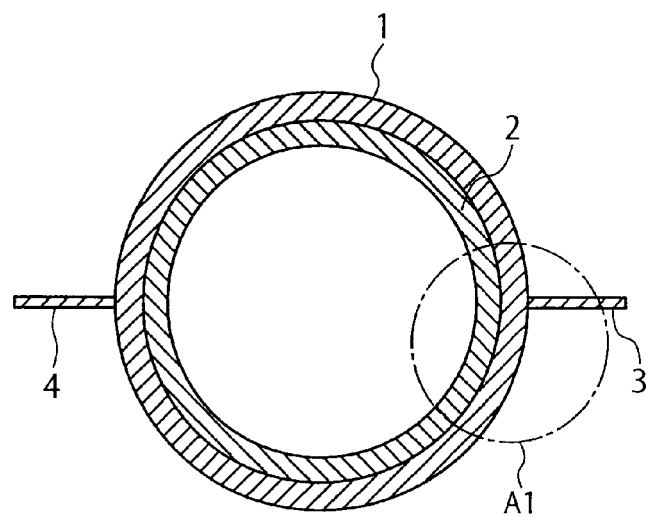
FIGS. 1A and 1B are a plain view and a vertical cross-sectional view respectively illustrating a structure of a flange fastening section according to a first embodiment of the present invention.

As illustrated in FIG. 1A, an O-ring 1 is arranged on an outer side of a spiral gasket 2 so as to be joined or adjacent thereto. The O-ring 1 has a cavity through which working fluid may flow, and one or a plurality of working fluid inlet pipings 3 and one or a plurality of working fluid outlet pipings 4 are connected thereto. Herein, a configuration in which one working fluid inlet piping 3 and one working fluid outlet piping 4 are connected to one O-ring 1 is illustrated in FIG. 1A.

Figure 1B:
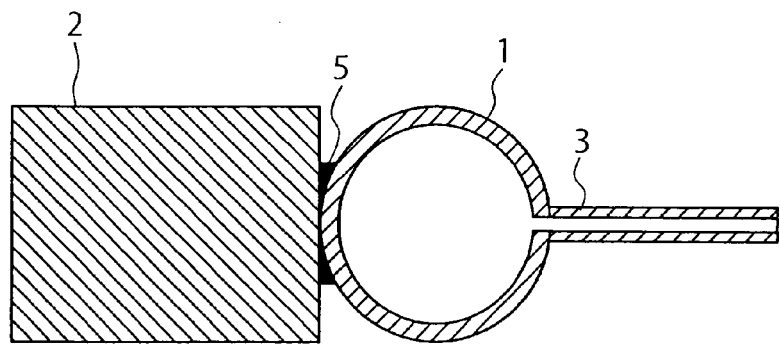

FIG. 1B is an enlarged view of a vertical cross-sectional surface of a part A1 enclosed by a circle in FIG. 1A. Meanwhile, a configuration in which the O-ring 1 and the spiral gasket 2 are joined to each other at a joint section 5 by welding and the like is illustrated in FIG. 1B. However, it does not limit the configuration, and a configuration in which the O-ring 1 and the spiral gasket 2 are not joined to each other and arranged so as to be independently adjacent to each other is also possible.

Figure 2:
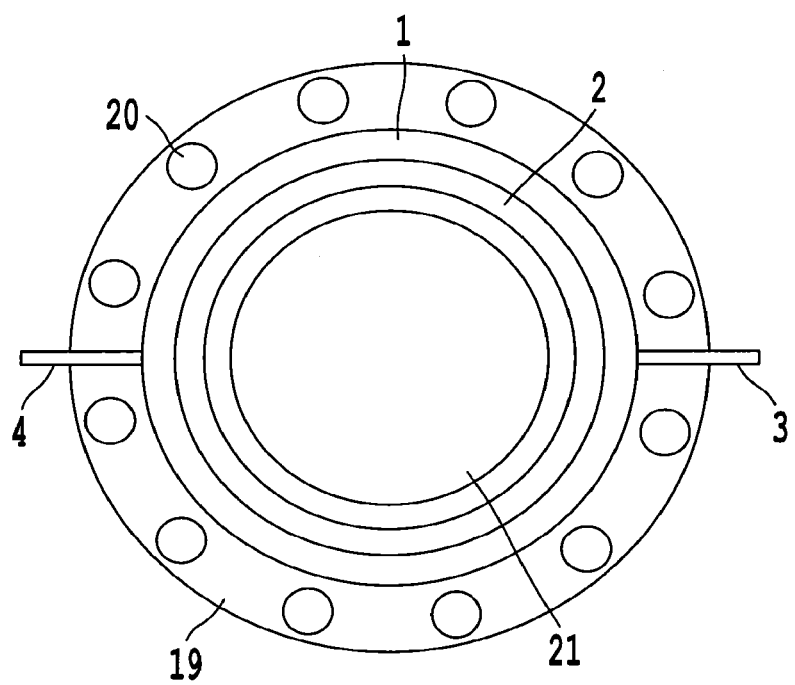
FIG. 2 is a plain view illustrating a state in which an O-ring and a spiral gasket are accommodated in a flange in the flange fastening section.

A state in which the O-ring 1 and the spiral gasket 2 are accommodated in the flange in such a flange fastening section is illustrated in FIG. 2. Holes 20 for fastening bolts are arranged on an outer peripheral portion of a flange 19 for connecting two steam pipings, and a piping inner portion 21 which communicates with a steam piping is located on a central portion.

A ring-shaped groove exists between the outer peripheral portion of the flange 19 and the piping inner portion 21, and the above-described O-ring 1 and the spiral gasket 2 are accommodated therein.

The working fluid of which temperature is lower than that of the fluid flowing through the steam piping flows into the O-ring 1 from the working fluid inlet piping 3 and flows out of the working fluid outlet piping 4, thereby cooling the spiral gasket 2 and the O-ring 1.

Meanwhile, in the configuration illustrated in FIGS. 1A, 1B and 2, one O-ring 1 is arranged on the outer side of the spiral gasket 2. However, the number is not limited to this, and a plurality of O-rings 1 may be arranged on the outer side of the spiral gasket 2.

(Configuration of Second Embodiment)

The configuration of the flange fastening section according to a second embodiment of the present invention is described with reference to FIGS. 3A and 3B.

Figure 3A:
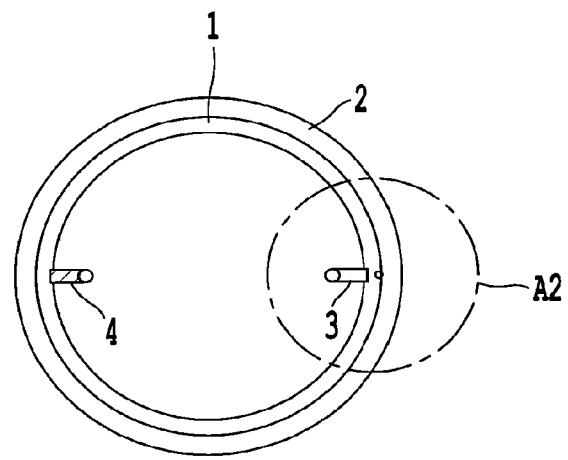
FIGS. 3A and 3B are a plain view and a vertical cross-sectional view respectively illustrating a structure of a flange fastening section according to a second embodiment of the present invention.

As illustrated in FIG. 3A, the O-ring 1 is arranged on an inner side of the spiral gasket 2 so as to be joined or adjacent thereto. The O-ring 1 has a cavity through which the working fluid may flow, and one or a plurality of working fluid inlet pipings 3 and one or a plurality of working fluid outlet pipings 4 are connected thereto.

A configuration in which one working fluid inlet piping 3 and one working fluid outlet piping 4 are connected to one O-ring 1 is illustrated in FIG. 3A.

Figure 3B:
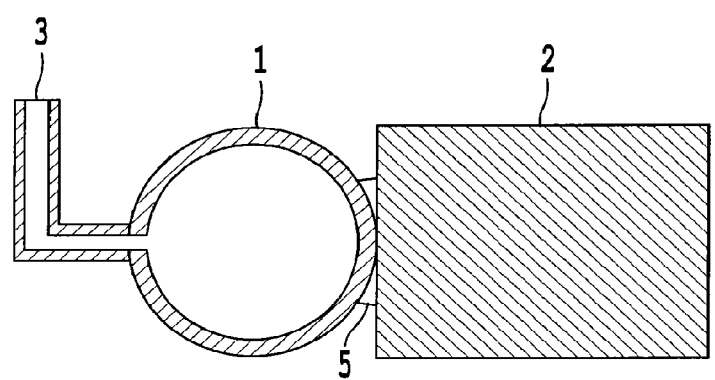

FIG. 3B is an enlarged view of a vertical cross-sectional surface of a part A2 enclosed by a circle in FIG. 3A. An example in which the O-ring 1 and the spiral gasket 2 are joined to each other at the joint section 5 by welding and the like is illustrated in FIG. 3B. However, it is not limited to this configuration, and a configuration in which the O-ring 1 and the spiral gasket 2 are not joined to each other and arranged so as to be separately adjacent to each other is also possible.

The working fluid flows into the O-ring 1 from the working fluid inlet piping 3 and flows out of the working fluid outlet piping 4, thereby cooling the spiral gasket 2 and the O-ring 1.

In the configuration illustrated in FIG. 3, one O-ring 1 is arranged on the inner side of the spiral gasket 2. However, the number is not limited to this, and a plurality of O-rings 1 may be arranged on the inner side of the spiral gasket 2.

(Configuration of Third Embodiment)

A configuration of the flange fastening section according to a third embodiment of the present invention is described with reference to FIG. 4.

Figure 4A:
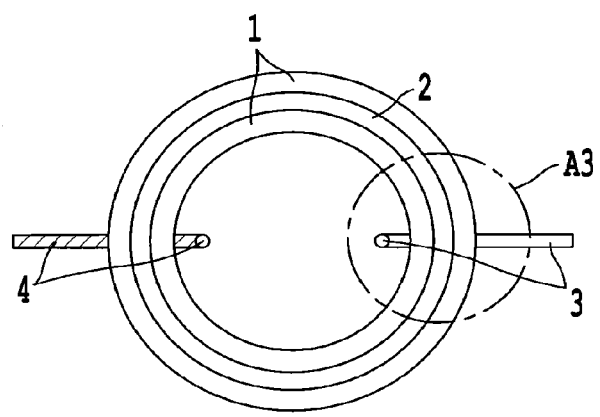
FIGS. 4A and 4B are a plain view and a vertical cross-sectional view respectively illustrating a structure of a flange fastening section according to a third embodiment of the present invention.

As illustrated in FIG. 4A, the O-rings 1 are arranged on the inner side and the outer side of the spiral gasket 2 so as to be joined or adjacent thereto.

The O-ring 1 has the cavity through which the working fluid may flow, and one or a plurality of working fluid inlet pipings 3 and one or a plurality of working fluid outlet pipings 4 are connected thereto.

A configuration in which one O-ring 1 is arranged on each of the inner and outer sides of the spiral gasket 2 and one working fluid inlet piping 3 and one working fluid outlet piping 4 are connected to the O-rings 1 is illustrated in FIG. 4A.

Figure 4B:
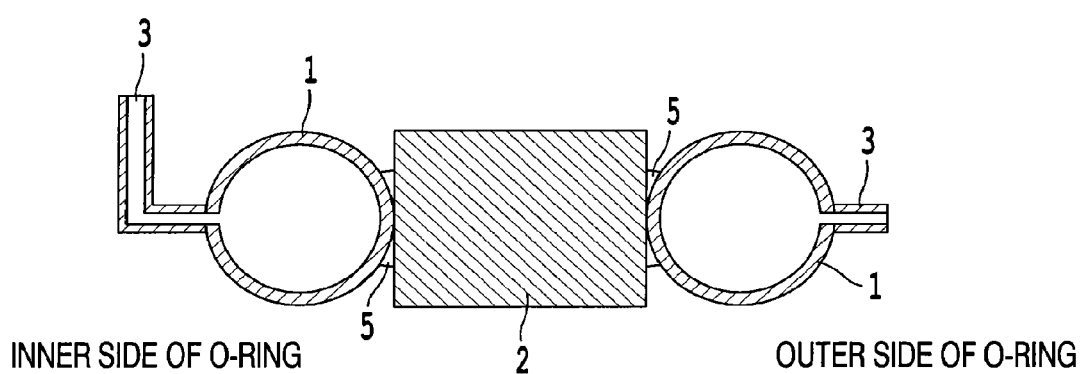

FIG. 4B is an enlarged view of a vertical cross-sectional surface of a part A3 enclosed by a circle in FIG. 4A. An example in which the O-rings 1 and the spiral gasket 2 are joined to each other at the joint section 5 by welding and the like is illustrated in FIG. 4B. However, it is not limited to the example, and a configuration in which the O-ring 1 and the spiral gasket 2 are not joined to each other and are separately arranged so as to be adjacent to each other is also possible.

The working fluid flows into the O-ring 1 from the working fluid inlet piping 3 and flows out of the working fluid outlet piping 4, thereby more efficiently cooling the spiral gasket 2 through the O-rings 1 arranged on the inner and outer sides thereof.

Meanwhile, in the configuration illustrated in FIG. 4, one O-ring 1 is arranged on each of the inner side and the outer side of the spiral gasket 2. However, the number is not limited to this, and a plurality of O-rings 1 may be arranged on the inner side of the spiral gasket 2 and a plurality of O-rings 1 may be arranged on the outer side of the spiral gasket 2.

(Configuration of Fourth Embodiment)

A configuration of the flange fastening section according to a fourth embodiment of the present invention is described with reference to FIGS. 5A and 5B.

Figure 5A:
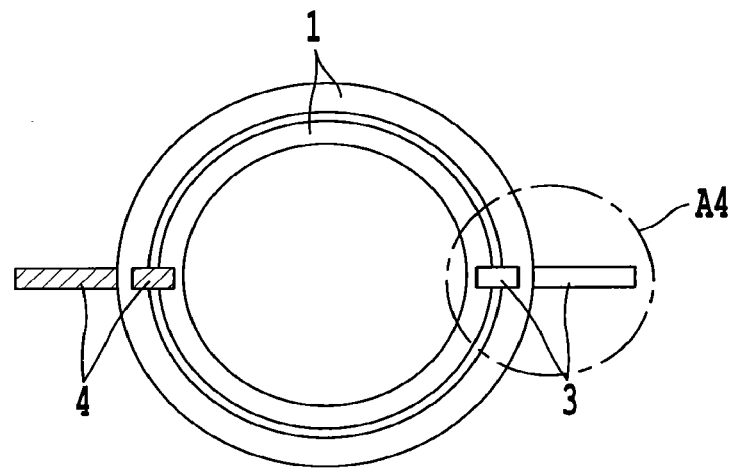
FIGS. 5A and 5B are a plain view and a vertical cross-sectional view respectively illustrating a structure of a flange fastening section according to a fourth embodiment of the present invention.

As illustrated in FIG. 5A, one or a plurality of working fluid inlet pipings 3 and one or a plurality of working fluid outlet pipings 4 are connected to one or a plurality of O-rings 1. The O-ring 1 has the cavity through which the working fluid may flow. A configuration in which one working fluid inlet piping 3 and one working fluid outlet piping 4 are connected to two O-rings 1 is illustrated in FIG. 5A.

Figure 5B:
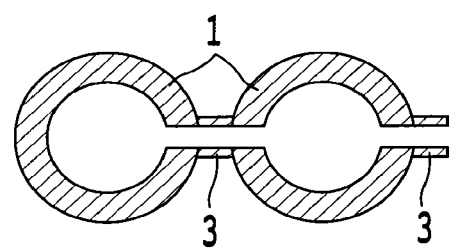

FIG. 5B is an enlarged view of a vertical cross-sectional surface of a part A4 enclosed by a circle in FIG. 5A. The working fluid flows into the O-ring 1 from the working fluid inlet piping 3 and flows out of the working fluid outlet piping 4, thereby cooling the O-ring 1.

A configuration in which the two O-rings 1 are coupled to each other by the working fluid piping 3 by welding and the like is illustrated in FIGS. 5A and 5B. However, it is not limited to the configuration and a configuration with one O-ring 1 is also possible. Alternatively, a configuration in which a plurality of O-rings 1 are not joined to each other and are arranged so as to be separately adjacent to each other is also possible.

(Configuration of Fifth Embodiment)

A configuration of the flange fastening section according to a fifth embodiment is described with reference to FIGS. 6A and 6B.

Figure 6A:
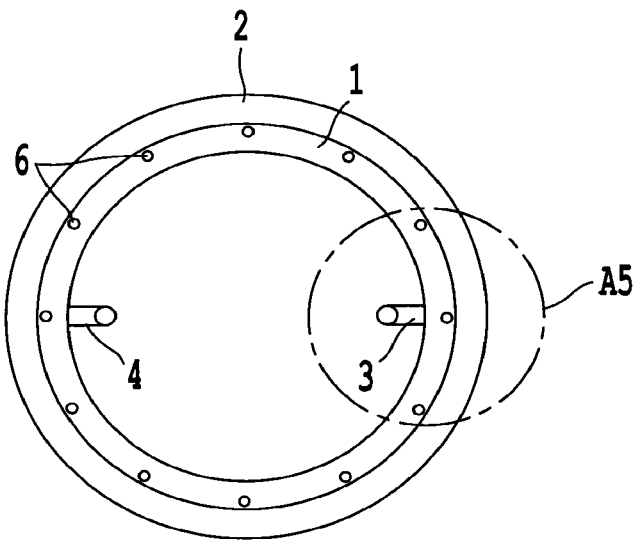
FIGS. 6A and 6B are a plain view and a vertical cross-sectional view respectively illustrating a structure of a flange fastening section according to a fifth embodiment of the present invention.

As illustrated in FIG. 6A, the O-ring 1 is arranged on the inner side of the spiral gasket 2 so as to be joined or adjacent thereto.

The O-ring 1 has the cavity through which the working fluid may flow and one or a plurality of working fluid inlet pipings 3 and one or a plurality of working fluid outlet pipings 4 are connected thereto.

Figure 6B:
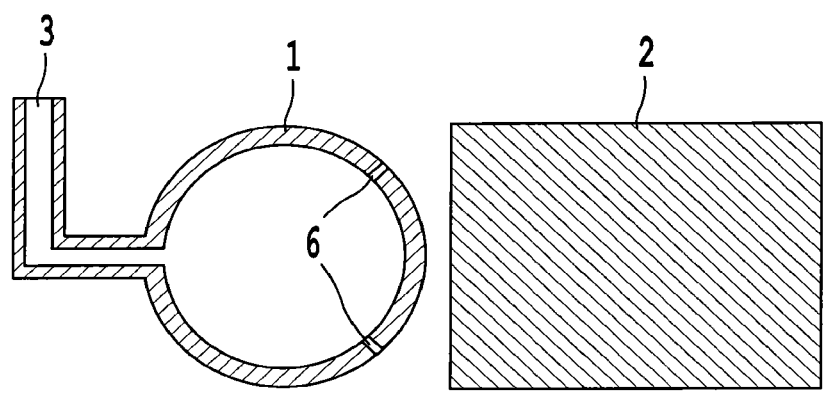

FIG. 6B is an enlarged view of a vertical cross-sectional surface of a part A5 enclosed by a circle in FIG. 6A. A plurality of openings 6 are formed on a surface of the O-ring 1 in a scattering manner. The opening 6 is desirably formed on a side closer to the spiral gasket 2 in the vertical cross-sectional surface of the O-ring 1 as illustrated in FIG. 6B. More specifically, as will be described later with reference to FIG. 9B, the opening 6 is desirably formed in an area, which faces a space enclosed by a sheet portion at which a flange groove and the O-ring 1 come into contact with each other and the spiral gasket 2.

When the working fluid flows into the O-ring 1 from the working fluid inlet piping 3 and flows out of the working fluid outlet piping 4, the working fluid leaks from the opening 6 arranged on the side closer to the spiral gasket 2, thereby directly cooling the spiral gasket 2 more efficiently.

A configuration in which the O-ring 1 and the spiral gasket 2 are not joined to each other and are arranged so as to be independently and separately adjacent to each other is illustrated in FIGS. 6A and 6B. However, a configuration in which the O-ring 1 and the spiral gasket 2 are joined at the joint section by welding and the like is also possible.

It is also possible that a plurality of O-rings 1 are arranged on the inner side or the outer side of the spiral gasket 2. In this case, the opening 6 may be formed on the side closer to the spiral gasket 2 in at least one O-ring 1 arranged on a position the closest to the spiral gasket 2 out of a plurality of O-rings 1.

Alternatively, the opening 6 may be formed also in a case in which one or a plurality of O-rings 1 are arranged on the inner side of the spiral gasket 2 and further one or a plurality of O-rings 1 are arranged on the outer side of the spiral gasket 2 as in the above-described third embodiment. In this case, the opening 6 may be formed on the side closer to the spiral gasket 2 in at least one of the O-rings 1 arranged on positions the closest to the spiral gasket 2 out of one or a plurality of O-rings 1 arranged on each of the inner and outer sides of the spiral gasket 2.

(Configuration of Sixth Embodiment)

A configuration of a cooling system of the flange fastening section according to a sixth embodiment of the present invention is described with reference to FIG. 10. In the cooling system according to the sixth embodiment, the flange fastening section according to any one of the above-described first to fourth embodiments is used.

Figure 10:
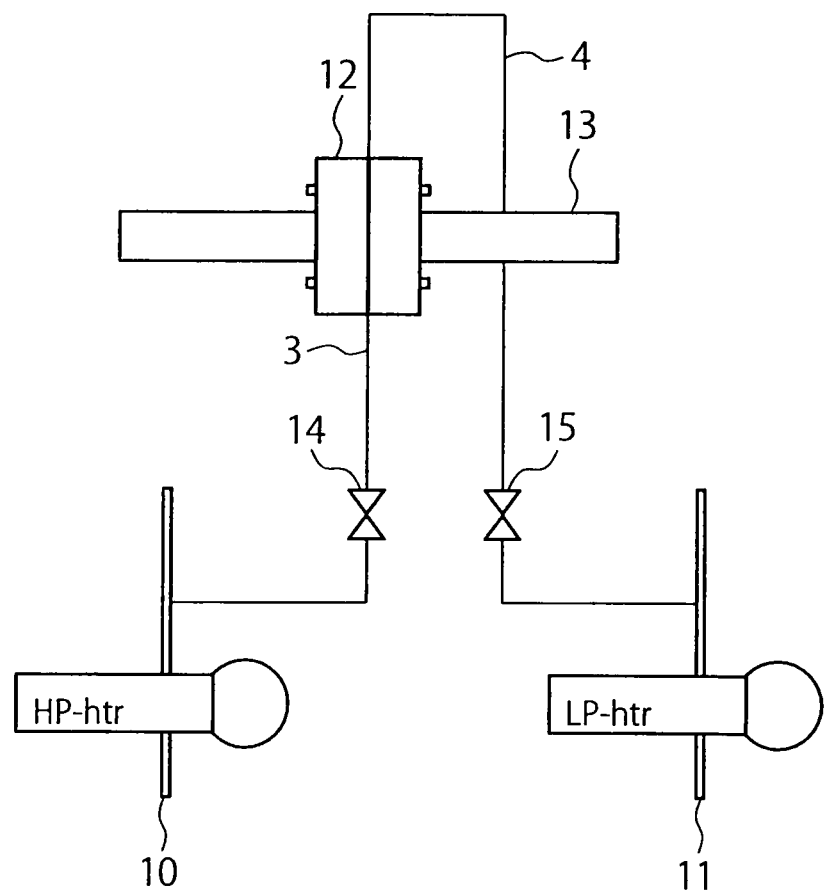
FIG. 10 is a illustrative diagram illustrating a function and an effect of the flange fastening section according to the sixth embodiment of the present invention.

A configuration of the cooling system of the flange fastening section according to the sixth embodiment is illustrated in FIG. 10 to describe the cooling system according to this embodiment.

Herein, water is used as the working fluid. The working fluid inlet piping 3 is branched from a high-pressure feed-water system piping 10 connected to a high-pressure heater (HP-htr). The branched working fluid inlet piping 3 passes through an inlet adjusting valve 14 to reach the flange fastening section 12 through the working fluid inlet piping 3. The flange fastening section 12 is a connecting section of two steam pipings 13, and steam, which is the working fluid flowing through the steam piping 13, heats the flange fastening section 12.

The water guided into the flange fastening section 12 cools the O-ring 1 and the spiral gasket 2 or the O-ring 1 by the above-described configuration provided on the flange fastening section according to any one of the above-described first to fourth embodiments. The water after a certain heat exchange flows out of the flange fastening section 12 and passes through an outlet adjusting valve 15 through the working fluid outlet piping 4 to reach a low-pressure feed-water system piping 11 in which pressure is lower than that on an upstream side. The low-pressure feed-water system piping 11 is connected to a low-pressure feed-water heater (LP-htr).

Meanwhile, due to high heat exchanger effectiveness and manageability of the water, not the steam but the water is used in this case as the working fluid.

(Configuration of Seventh Embodiment)

Figure 11:
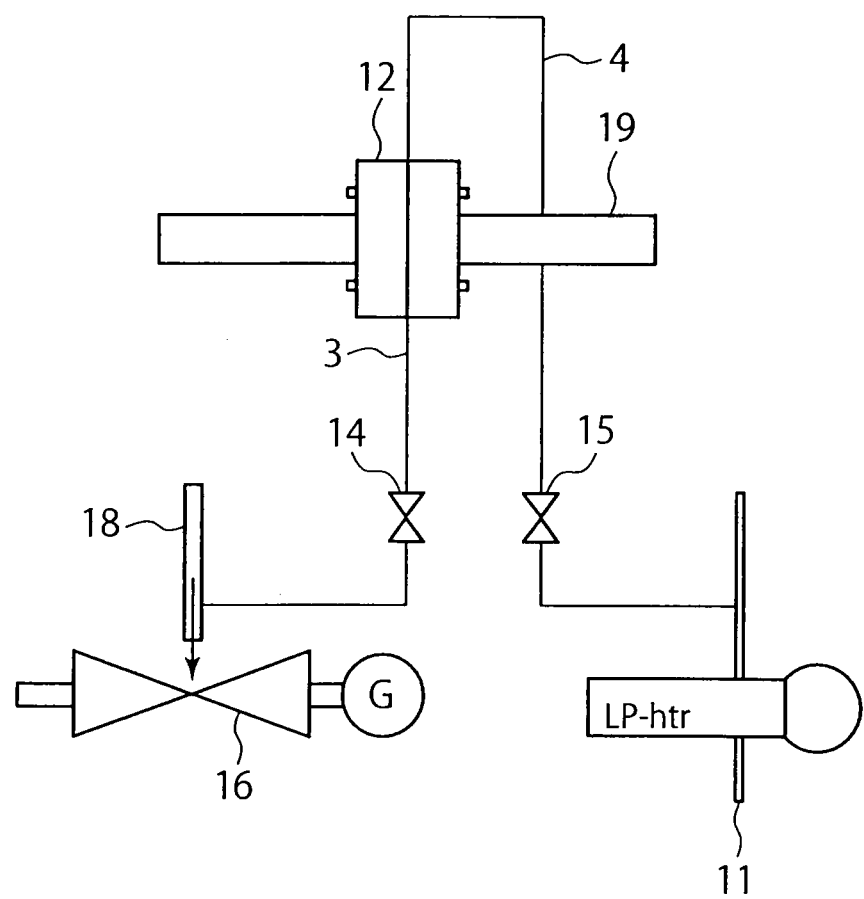
FIG. 11 is a illustrative diagram illustrating a function and an effect of the flange fastening section according to the seventh embodiment of the present invention.
Figure 12A:
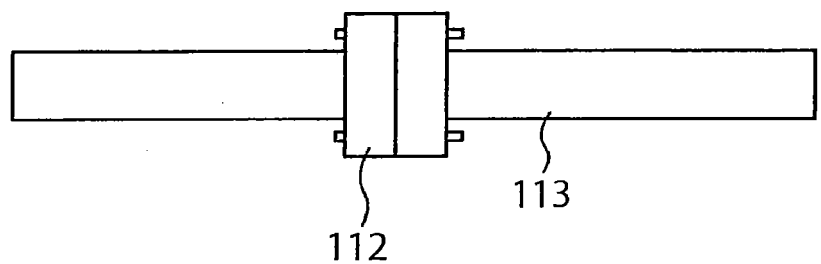
FIGS. 12A, 12B and 12C are illustrative diagrams illustrating a structure of a conventional flange fastening section.
Figure 12B:
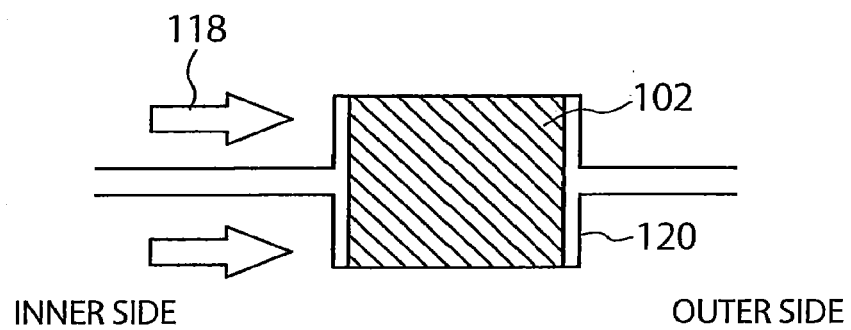
Figure 12C:
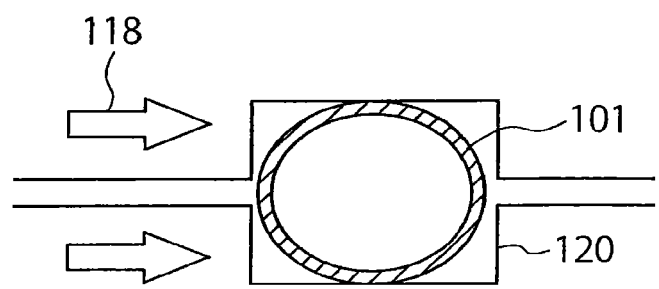

The cooling system of the flange fastening section according to a seventh embodiment of the present invention is described with reference to FIG. 11. The seventh embodiment is the system to cool the flange fastening section according to any one of the above-described first to fifth embodiments and uses the steam as the working fluid.

Herein, the flange fastening section of a reheat steam lead piping arranged before a combination reheat valve (CRV) of a hot reheat piping is described as an example of the flange fastening section 12.

The working fluid inlet piping 3 is branched from a main steam piping 18 connected to a high-pressure turbine 16. Meanwhile, the steam is herein used as the working fluid.

The branched working fluid inlet piping 3 passes through the inlet adjusting valve 14 to reach the flange fastening section 12 through the working fluid inlet piping 3. The flange fastening section 12 corresponds to a connecting section of the reheat steam piping 19 and the steam, which flows through the reheat steam piping 19, heats the flange fastening section 12.

The steam of which temperature is lower than that of the working fluid in the steam piping 13, which is guided into the flange fastening section 12, cools the O-ring 1 and the spiral gasket 2 by the above-described configuration of the flange fastening section according to any one of the above-described first to fifth embodiments. The steam after the certain heat exchange flows out of the flange fastening section 12 and passes through the working fluid outlet piping 4, the outlet adjusting valve 15 and low-pressure feed-water system piping 11 to flow out to a condenser not illustrated in which pressure is lower than that on the upstream side. The low-pressure feed-water system piping 11 is connected to a low-pressure feed-water heater (LP-htr).

(Function and Effect of First Embodiment)

A function and an effect obtained by the flange fastening section according to the first embodiment are described in detail with reference to FIGS. 7A and 7B.

Figure 7A:
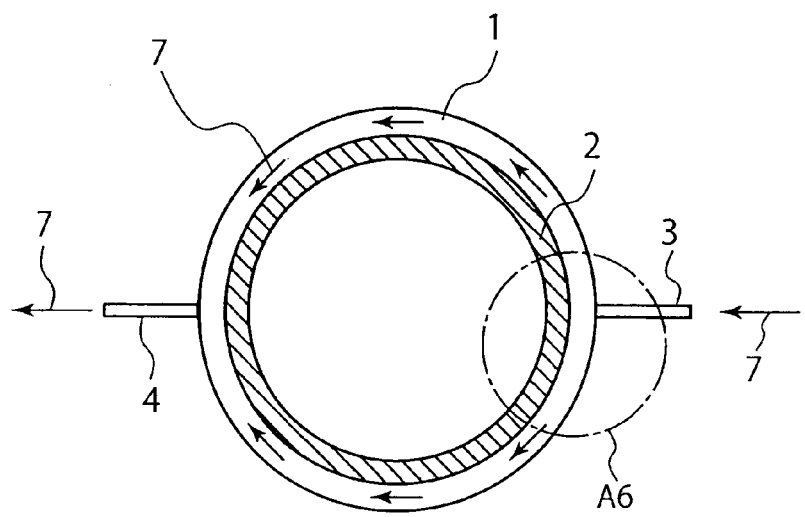
FIGS. 7A and 7B are illustrative diagrams illustrating a function and an effect of the flange fastening section according to the first, second and third embodiments of the present invention.

A state in which the working fluid flows through the flange fastening section according to the first embodiment is illustrated in FIG. 7A. FIG. 7B is an enlarged view of a vertical cross-sectional surface of a part A6 enclosed by a circle in FIG. 7A, which illustrates a state in which the O-ring 1 and the spiral gasket 2 are cooled by a heat exchange effect by the working fluid.

The working fluid of which temperature is lower than that of the working fluid in the steam piping fastened by the flange fastening section delivered from outside the flange fastening section flows into the O-ring 1 from the working fluid inlet piping 3 from a right side in FIG. 7A. The working fluid, which flows by being divided to an upper side and a lower side in the drawing in the O-ring 1, joins together to flow out of the flange fastening section from the working fluid outlet piping 4.

Figure 7B:
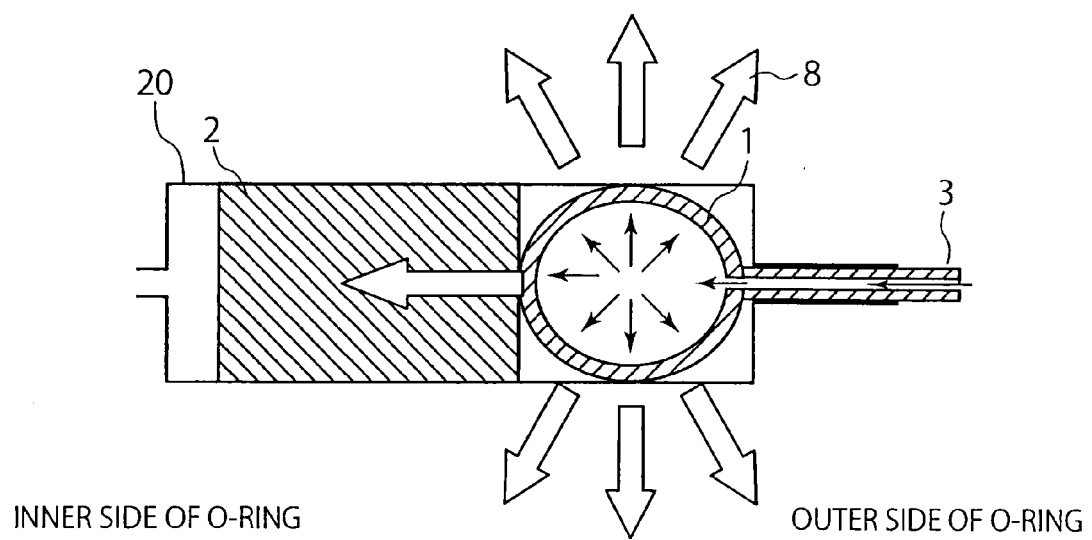

A state in which a pressure of the working fluid, which flows into the O-ring 1 from the working fluid inlet piping 3, acts in a direction perpendicular to a surface of the O-ring 1 by the Archimedes' principle is illustrated in FIG. 7B. The flange groove 20 is cooled at the sheet portion at which the flange groove 20 and the O-ring 1 come into contact with each other, and the spiral gasket 2 is cooled in a direction indicated by an arrow 8.

Since the working fluid flows in from outside the flange fastening section and flows out of the same, the flange groove 20, which comes into contact with the O-ring 1 at the flange fastening section, acts as a kind of heat exchanger, and the spiral gasket 2 loaded on the flange groove 20 is cooled. According to this, expanded graphite being a hoop material composing the spiral gasket 2 may be cooled to 650° C. at which steam oxidation occurs or lower, so that original stable sealing performance of the expanded graphite may be maintained.

(Function and Effect of Second and Third Embodiments)

The description of functions and effects of the second and third embodiments of the present invention is similar to that of the function and the effect of the first embodiment described with reference to FIGS. 7A and 7B.

With reference to FIG. 7A, in the flange fastening section according to the second embodiment, since the O-ring 1 is arranged on the inner side of the spiral gasket 2, a cooling effect is transmitted from the O-ring 1 on the inner side to the spiral gasket 2 on the outer side in the flange fastening section.

Further, in the flange fastening section according to the third embodiment, since the O-ring 1 is arranged on each of the inner side and the outer side of the spiral gasket 2, the cooling effect is transmitted from the O-ring 1 on the inner side of the flange to the spiral gasket 2 on the outer side thereof, and further transmitted from the O-ring 1 on the outer side to the spiral gasket 2 on the inner side thereof. According to this, the effect of cooling the spiral gasket may be further improved.

(Function and Effect of Fourth Embodiment)

A function and an effect of the fourth embodiment of the present invention are described with reference to FIGS. 8A and 8B.

Figure 8A:
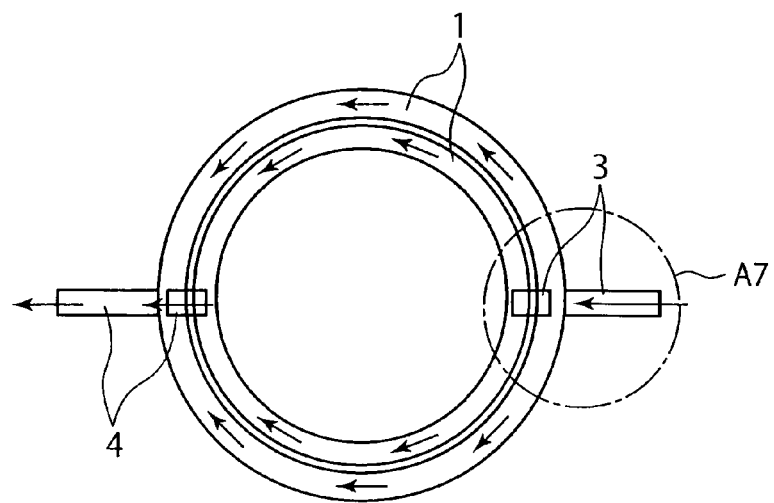
FIGS. 8A and 8B are illustrative diagrams illustrating a function and an effect of the flange fastening section according to the fourth embodiment of the present invention.

A state in which the working fluid is allowed to flow through the flange fastening section according to the fourth embodiment is illustrated in FIG. 8A. FIG. 8B is an enlarged view of a vertical cross-sectional surface of a part A7 enclosed by a circle in FIG. 8A and illustrates a state in which the cooling effect is transmitted by the heat exchange effect of the working fluid.

In FIG. 8A, the working fluid acting as refrigerant of which temperature is lower than that of the working fluid in the steam piping fastened by the flange fastening section delivered from a right side in the drawing of the flange fastening section flows into the O-ring 1 from the working fluid inlet piping 3. The working fluid divided into an upper side and a lower side in the drawing at a crossroad at which the O-ring 1 and the working fluid inlet piping 3 are connected to each other flows around the O-ring 1 and joins together again at a crossroad at which the O-ring 1 and the working fluid outlet piping 4 are connected to each other to flow out of the flange fastening section from the working fluid outlet piping 4.

Figure 8B:
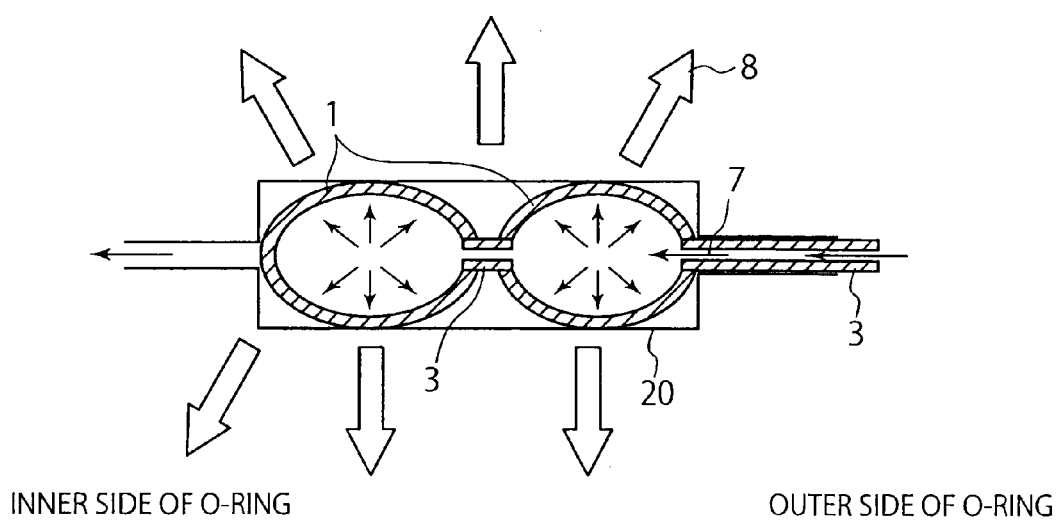

In FIG. 8B, the pressure of the working fluid, which flows into the O-ring 1 from the working fluid inlet piping 3, acts in the direction perpendicular to the surface of the O-ring 1 by the Archimedes' principle. The flange groove 20 and the O-ring 1 itself, which come into contact with each other at the sheet portion of the O-ring 1, are cooled in the direction indicated by the arrow 8.

Since the working fluid flows into the flange fastening section from outside and flows out of the same, the flange groove 20 acts as a kind of heat exchanger, and the flange groove 20 and the O-ring 1 itself loaded on the flange groove 20 remain cooled. According to this, since plastic deformation due to a high temperature does not occur in the O-ring 1, original stable sealing performance may be maintained and a selection range of a material of the O-ring 1 body may be extended.

(Function and Effect of Fifth Embodiment)

A function and an effect of the fifth embodiment of the present invention are described with reference to FIGS. 9A and 9B.

Figure 9A:
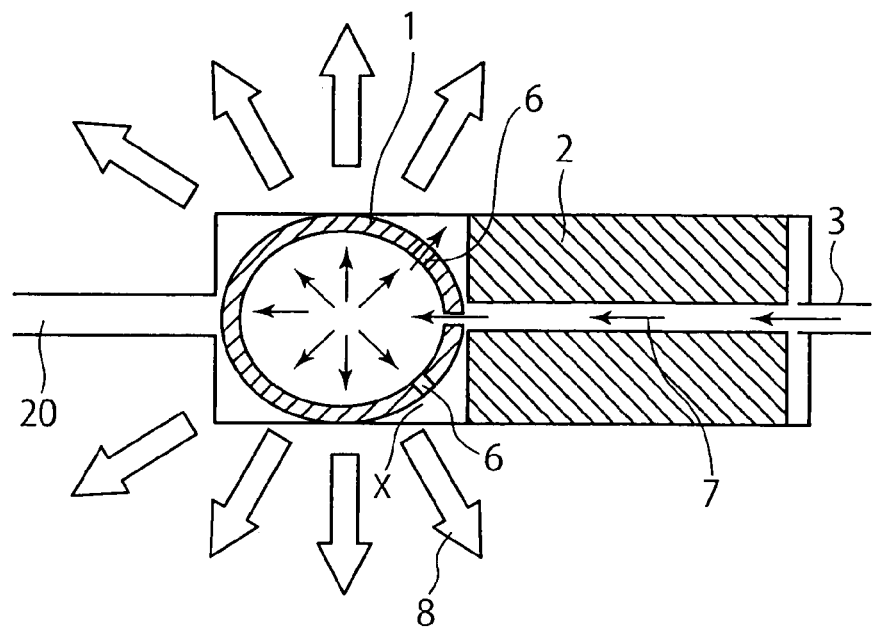
FIGS. 9A and 9B are illustrative diagrams illustrating a function and an effect of the flange fastening section according to the fifth embodiment of the present invention.

A state of the inner portion of the flange fastening section according to the fifth embodiment in which the spiral gasket 2 and the O-ring 1 are cooled in the direction indicated by the arrow 8 by the heat exchange effect of the working fluid is illustrated in FIG. 9A. In this case, the sheet portion at which the O-ring 1 and the flange groove 20 come into contact with each other is illustrated in FIG. 9B in an enlarged manner.

Figure 9B:
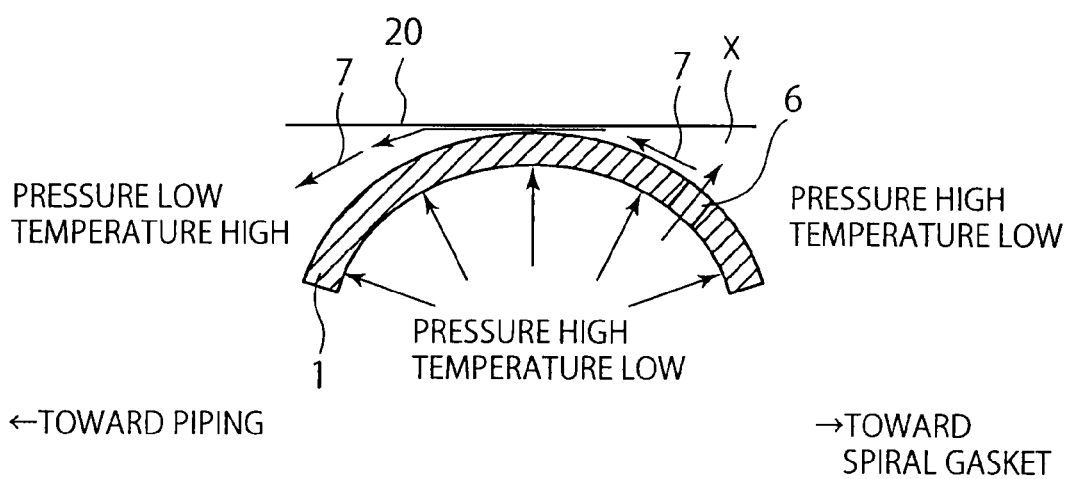

As illustrated in FIG. 9B, the pressure of the working fluid, which flows into the O-ring 1 as indicated by an arrow 7 from the working fluid inlet piping 3, acts in the direction perpendicular to the surface of the O-ring 1 by the Archimedes' principle to cool the flange groove 20, which comes into contact with the sheet portion of the O-ring 1 and further the spiral gasket 2.

As illustrated in FIG. 9A, a plurality of openings 6 are formed on the surface of the O-ring 1. In the O-ring 1, the opening 6 is desirably formed in the area, which faces the space enclosed by the sheet portion, at which this comes into contact with the flange groove 20 and the spiral gasket 2.

The steam leaks from the opening 6 of the O-ring 1. A precondition in this case is that the working fluid of which pressure is higher and temperature is lower than those of the steam flowing through the steam piping fastened by the flange fastening section flows through the O-ring 1.

The pressure and the temperature in a space X enclosed by the sheet portion of the O-ring 1 at which the flange groove 20 and the O-ring 1 come into contact with each other and the spiral gasket 2 and the pressure and the temperature in the O-ring 1 are substantially the same in a stagnating state due to the steam leaked from the opening 6.

A case in which the sheet portion of the O-ring 1 at which the flange groove 20 and the O-ring 1 come into contact with each other is broken by some reasons is considered. The pressure in the steam piping fastened by the flange fastening section is lower than the pressure in the above-described space X. As indicated as the flow direction 7 of the working fluid in FIG. 9B, inner leak occurs from a right side to a left side in the drawing. According to this, the working fluid of which temperature is high in the steam piping flowing on the left side in the drawing does not come into contact with the spiral gasket, so that a case in which the spiral gasket 2 is exposed to the high temperature may be prevented.

(Function and Effect of Sixth Embodiment)

A function and an effect of the cooling system of the flange fastening section according to the sixth embodiment are described with reference to FIG. 10. In this embodiment, the flange fastening section according to any one of the above-described first to fourth embodiments is used as described above.

The working fluid inlet piping 3 is branched from the high-pressure feed-water system piping 10 connected to the high-pressure heater (HP-htr) and passes through the inlet adjusting valve 14 to reach the flange fastening section 12 through the working fluid inlet piping 3. The water as the working fluid is guided into the flange fastening section 12 through this route to cool the O-ring 1 and the spiral gasket 2. After the heat exchange, the water as the working fluid flows out of the flange fastening section 12 and passes through the outlet adjusting valve 15 through the working fluid outlet piping 4, and flows out to the low-pressure feed-water system piping 11. The low-pressure feed-water system piping 11 is connected to the low-pressure feed-water heater (LP-htr).

According to this, the expanded graphite being the hoop material composing the spiral gasket 2 may be cooled to 650° C. at which the steam oxidation occurs or lower, so that the stable sealing performance of the expanded graphite may be maintained.

Function and Effect of Seventh Embodiment

A function and an effect of the cooling system of the flange fastening section according to the seventh embodiment of the present invention are described with reference to FIG. 11. In this embodiment, the flange fastening section according to any one of the above-described first to fifth embodiments is used as described above.

The working fluid inlet piping 3 is branched from the main steam piping 18 connected to the high-pressure turbine 16 and passes through the inlet adjusting valve 14 to reach the flange fastening section 12 through the working fluid inlet piping 3. The steam as the working fluid is guided into the flange fastening section 12 through this route to cool the O-ring 1 and the spiral gasket 2. After the heat exchange, the steam as the working fluid flows out of the flange fastening section 12 and passes through the working fluid outlet piping 4, the outlet adjusting valve 15 and the low-pressure feed-water system piping 11, and flows out to the condenser not illustrated. The low-pressure feed-water system piping 11 is connected to the low-pressure feed-water heater (LP-htr).

Especially, when using the flange fastening section according to the above-described fifth embodiment, although the opening 6 is formed on the O-ring 1 as illustrated in FIG. 9B, since the steam is used as the working fluid, steam explosion does not occur at the time of internal leak of the working fluid flowing out of the opening 6 as described above.

In this manner, the expanded graphite being the hoop material composing the spiral gasket 2 may be cooled to 650° C. or lower at which the steam oxidation occurs or lower, so that the stable sealing performance of the expanded graphite may be maintained.

Each of the above-described embodiments is merely an example and does not intend to limit the present invention, and may be modified within the technical scope of the present invention.

The invention claimed is:

1. A flange fastening section for cooling the flange, comprising:
    a flange of a pipe for forming a connection of the pipe to another pipe by connection of the flange to a flange of the another pipe, wherein the flange of the pipe has a groove in a face of the flange, which face is the face of the flange to be connected to a face of the flange of the another pipe for forming the connection;
    a gasket including expanded graphite at least partly accommodated in the groove; and
    a hollow O-ring at least partly accommodated in the groove and arranged on an outer radial peripheral surface of the gasket, wherein
    the hollow of the O-ring is a cavity through which working fluid may flow, the O-ring having an inlet piping into which the working fluid may flow and an outlet piping out of which the working fluid may flow.

2. A flange fastening section for cooling the flange, comprising:
    a flange of a pipe for forming a connection of the pipe to another pipe by connection of the flange to a flange of the another pipe, wherein the flange of the pipe has a groove in a face of the flange, which face is the face of the flange to be connected to a face of the flange of the another pipe for forming the connection;

a gasket including expanded graphite at least partly accommodated in the groove; and a hollow O-ring at least partly accommodated in the groove and arranged on an inner radial peripheral surface of the gasket, wherein the hollow of the O-ring is a cavity through which working fluid may flow, the O-ring having an inlet piping into which the working fluid may flow and an outlet piping out of which the working fluid may flow.

3. The flange fastening section according to any one of claims 1 or 2, wherein the O-ring and the gasket are arranged in a state joined to each other.

4. The flange fastening section according to any one of claim 1 or 2, wherein the O-ring and the gasket are arranged adjacent to each other without being joined to each other.

5. A cooling system of a flange fastening section, comprising:

the flange fastening section according to any one of claims 1 or 2, a first piping connected to the inlet piping for supplying the working fluid to the hollow of the O-ring; and a second piping connected to the outlet piping for discharging the working fluid flowing out of the hollow of the O-ring, wherein a pressure in the first piping is higher than a pressure in the second piping, and the working fluid is water whose temperature is lower than a temperature of fluid flowing through the pipe having the flange.

6. The cooling system of a flange fastening section according to claim 5, wherein the first piping is connected to a high-pressure heater, and the second piping is connected to a low-pressure feed-water heater.

7. A cooling system of a flange fastening section, comprising:

the flange fastening section according to any one of claims 1 or 2;

a first piping connected to the inlet piping for supplying the working fluid to the hollow of the O-ring;

a second piping connected to the outlet piping for discharging the working fluid flowing out of the hollow of the O-ring;

a first feed-water system piping connected to the first piping through an input adjusting valve; and a second feed-water system piping connected to the second piping through an output adjusting valve, wherein a pressure in the first piping is higher than a pressure in the second piping, and the working fluid is water of which temperature is lower than a temperature of fluid flowing through the pipe having the flange.

8. The cooling system of a flange fastening section according to claim 7, wherein the first feed-water system piping is connected to a high-pressure heater, and the second feed-water system piping is connected to a low-pressure feed-water heater.

9. A cooling system of a flange fastening section, comprising:

the flange fastening section according to any one of claims 1 or 2;

a first piping connected to the inlet piping for supplying the working fluid to the hollow of the O-ring;

a second piping connected to the outlet piping for discharging the working fluid flowing out of the hollow of the O-ring;

a third piping connected to the first piping through an input adjusting valve;

a fourth piping connected to the second piping through an output adjusting valve; and a turbine connected to the third piping, wherein a pressure in the first piping is higher than a pressure in the second piping, and the working fluid is water of which temperature is lower than a temperature of fluid flowing through the pipe having the flange.

10. The cooling system of a flange fastening section according to claim 9, wherein the second piping is connected to a low-pressure feed-water heater.

11. A flange fastening section for cooling the flange, comprising:

a flange of a pipe for forming a connection of the pipe to another pipe by connection of the flange to a flange of the another pipe, wherein the flange of the pipe has a groove in a face of the flange, which face is the face of the flange to be connected to a face of the flange of the another pipe for forming the connection;

a gasket including expanded graphite at least partly accommodated in the groove; and two hollow O-rings at least partly accommodated in the groove, wherein one of said two O-rings is arranged on each of outer and inner radial peripheral surfaces of the gasket, wherein the hollow of each of the two O-rings is a cavity through which working fluid may flow, each of the O-rings having an inlet piping into which the working fluid may flow and an outlet piping out of which the working fluid may flow.

\* \* \* \* \*